US007600579B2

(12) United States Patent
Wasielewski

(10) Patent No.: US 7,600,579 B2
(45) Date of Patent: Oct. 13, 2009

(54) IN-TOOL WRENCH STORAGE SYSTEM

(75) Inventor: Kevin Wasielewski, Schaumburg, IL (US)

(73) Assignee: Robert Bosch GmbH, Stuttgart (DE)

( * ) Notice: Subject to any disclaimer, the term of this patent is extended or adjusted under 35 U.S.C. 154(b) by 139 days.

(21) Appl. No.: 11/824,625

(22) Filed: Jul. 2, 2007

(65) Prior Publication Data

US 2009/0008282 A1 Jan. 8, 2009

(51) Int. Cl.
*B23B 39/00* (2006.01)
*A45C 11/26* (2006.01)

(52) U.S. Cl. ......................... 173/217; 173/29; 173/170; 173/171; 206/349; 206/376; 409/182

(58) Field of Classification Search ................. 173/170, 173/29, 171, 217; 409/182, 135, 181; 206/372, 206/376, 349, 216, 149; 408/124, 16, 241 R; 81/177.4, 490
See application file for complete search history.

(56) References Cited

U.S. PATENT DOCUMENTS

| | | | | |
|---|---|---|---|---|
| 1,712,343 | A * | 5/1929 | Gottfried | 81/490 |
| 4,381,037 | A | 4/1983 | Cuneo | |
| 4,586,615 | A * | 5/1986 | Quitmann | 211/70.6 |
| 4,997,085 | A | 3/1991 | Brennan | |
| 5,029,706 | A | 7/1991 | McCracken | |
| 5,346,063 | A * | 9/1994 | Chow | 206/376 |
| 5,395,271 | A * | 3/1995 | Tyler | 440/6 |
| 5,598,924 | A * | 2/1997 | McCann | 206/372 |
| 5,813,805 | A | 9/1998 | Kopras | |
| 5,851,141 | A | 12/1998 | Elmore | |
| 5,902,080 | A * | 5/1999 | Kopras | 409/182 |
| 6,443,675 | B1 | 9/2002 | Kopras et al. | |
| 6,679,391 | B1 | 1/2004 | Huang | |
| 6,754,935 | B2 | 6/2004 | Pozgay et al. | |
| 6,837,373 | B2 * | 1/2005 | Huang | 206/376 |
| 6,857,527 | B2 * | 2/2005 | Hu | 211/70.6 |
| 6,918,720 | B2 | 7/2005 | Kopras et al. | |
| 6,951,232 | B2 * | 10/2005 | McDonald et al. | 144/136.95 |
| 7,055,689 | B2 * | 6/2006 | Chen | 206/376 |
| 7,094,011 | B2 * | 8/2006 | Kopras et al. | 409/137 |
| 7,131,180 | B2 * | 11/2006 | Kopras et al. | 29/560 |

OTHER PUBLICATIONS

ROTO Owner's Manual, *Spiral Saw™ Power Tool*, Roto Zip Tool Corporation.

* cited by examiner

*Primary Examiner*—Scott A. Smith
(74) *Attorney, Agent, or Firm*—Maginot, Moore & Beck

(57) ABSTRACT

The present invention is a method and device for a hand power tool which includes a housing, a storage compartment within the housing, a wrench for manipulating a collet bit attachment structure, a portion of the wrench sized to fit within the storage compartment, a first spring extending into the storage cavity and positioned to bias the portion of the wrench against an inner wall of the storage compartment and a protuberance positioned on the housing, such that when the portion of the wrench is partially within the cavity, the protuberance causes a first misalignment between the longitudinal axis of the storage compartment and the longitudinal axis of the wrench and when the portion of the wrench is fully within the cavity, the protuberance does not cause a misalignment between the longitudinal axis of the storage compartment and the longitudinal axis of the wrench as large as the first misalignment.

13 Claims, 9 Drawing Sheets

IN-TOOL WRENCH STORAGE SYSTEM

FIELD OF THE INVENTION

The present invention relates to hand tools and more particularly to a power hand tool.

BACKGROUND

Hand held rotary tools are widely used by many people including professionals, craftspeople, homeowners, and artists. These rotary tools typically include an outer housing designed to be easily held within a human hand. The housing retains an electric motor which is operable to drive a rotatable chuck of the rotary tool. The widespread use of hand held rotary tools is a result, in part, of the wide variety of accessories that may be used with the tools. The accessories include cut-off wheels, polishing wheels, grinding wheels, sanding discs, routing bits and other cutting bits.

The accessories may be removably coupled with the rotary tool using a collet. By way of example, a prior art hand-held rotary power or cutting tool 20 is shown generally in FIGS. 1-3A. The rotary cutting tool 10 includes a motor housing 12 to which a detachable handle 14 is attached. An electric motor (not shown) is enclosed within the motor housing 12. The motor receives electrical power through an electrical cord 16 (only a portion of which is shown in FIG. 1). The electric motor is turned on and off by a power on/off switch 18 mounted on the motor housing 12.

An end of the motor shaft extends from one end of the motor housing 12. Attached to the end of the motor shaft is a collet bit attachment structure 20 for removably securing an accessory, such as those identified above, to the motor shaft. The collet bit attachment structure 20 includes a collet nut 22 and a collet 24 centered axially within a central aperture of the collet nut 22. The collet nut 22 is mounted on a threaded end of the motor shaft. To secure a bit to the motor shaft, a shank of the bit is inserted into a central aperture 26 of the collet 24. The collet nut 22 is then tightened, first by hand and then with a wrench 28, until the bit is held securely. To remove the bit from the motor shaft, the collet nut 22 is loosened, using the wrench 28, until the bit can be removed easily from the central aperture 26 of the collet 24.

The use of a wrench to tighten a collet bit attachment structure allows for accessories to be securely coupled with a tool. So as to ensure the proper wrench is available to a user, some devices provide a storage compartment within the rotary tool. For example, the wrench 28 for tightening the collet nut 24 may be stored in the compartment 30 formed inside the handle 14. The size of the compartment 30 is such that the wrench 28 is frictionally held therein to prevent it from sliding out during operation of the tool 10.

While the system of FIGS. 1-3A provides a convenient manner of storing a wrench that is used with a collet bit attachment structure, some users prefer a storage system that provides a more obvious indication that the wrench is firmly held within the storage compartment. Typically, a positive indication of proper insertion may be provided by a configuration that suddenly reduces the resistance to insertion of a component into a tool once the component is properly inserted into the tool. The sudden lessening of resistance provides positive feedback to the user that the component has been inserted into the tool.

Positive feedback may be provided in various ways. By way of example, FIG. 3A shows a housing 34 that includes a compartment 36. A coil spring 38 is positioned partially within the compartment 36. Accordingly, as the wrench 28 is inserted into the compartment 36, the wrench 28 compresses the coil spring 38. As a cavity 40 in the wrench 28 is positioned adjacent to the coil spring 38, the coil spring expands into the cavity 40. Positive feedback is thus provided to the user as the user feels the expansion of the coil spring 38 into the cavity 40.

While providing advantages, the use of a coil spring 38 tends to generate scratches on the wrench 28. Additionally, positioning the coil spring 28 within the housing 34 requires modification to both halves of the housing 34. Moreover, because the coil spring 38 is positioned within both halves of the housing 34, assembly of the device requires the coil spring 38 to be positioned within one half of the housing 34, with a portion of the coil spring 38 extending out of the half of the housing 34. Thus, the spring coil 38 may become misaligned during assembly of the housing 34.

While the provision of positive feedback is desired by some users, the manner in which a tool is configured in order to provide such feedback is also important to the users. For example, if the resistance is completely removed, the component is likely to move and rattle within the tool. Many users, however, interpret excessive movement and rattling of the components of a tool as an indicator of an inferior product, even if the movement and noise has no bearing upon the quality of the tool.

Moreover, other components in rotary tools require some amount of movement in order to provide the requisite operability. By way of example, the on/off switch is generally moved between a first position wherein power is applied to the internal motor and a second position wherein power is not applied to the internal power. Thus, some movement must be allowed. The allowance of movement is accomplished by designing the various components to be mismatched in size. While the mismatch in size allows for operation of the component, the resultant looseness may cause undesired noise as the tool is operated leading to the belief that the tool is an inferior device.

What is needed is a power hand tool which provides a positive indication that a tool such as a wrench is securely held therein. It would be beneficial to provide this benefit while minimizing the number of components needed to manufacture the tool.

What is further needed is a power hand tool which reduces noise and looseness of components. It would be beneficial to provide this benefit while minimizing the number of different components needed to manufacture the tool.

SUMMARY

The present invention is a method and device for a hand power tool system. In one embodiment, the device includes a housing, a storage compartment within the housing, a wrench for manipulating a collet bit attachment structure, a portion of the wrench sized to fit within the storage compartment, a first spring extending into the storage cavity and positioned to bias the portion of the wrench against an inner wall of the storage compartment and a protuberance positioned on the housing, such that when the portion of the wrench is partially within the cavity, the protuberance causes a first misalignment between the longitudinal axis of the storage compartment and the longitudinal axis of the wrench and when the portion of the wrench is fully within the cavity, the protuberance does not cause a misalignment between the longitudinal axis of the storage compartment and the longitudinal axis of the wrench as large as the first misalignment.

In one embodiment, a hand power tool system includes a housing, a storage compartment within the housing, a wrench for manipulating a collet bit attachment structure, a portion of the wrench sized to fit within the storage compartment; a first spring extending into the storage cavity and positioned to bias the portion of the wrench against an inner wall of the storage compartment, a switch movably attached to the housing, a second spring structurally identical to the first spring and positioned within the housing to bias the switch away from the housing and a protuberance positioned on the housing such that when the portion of the wrench is partially within the cavity, the protuberance causes a first misalignment between the longitudinal axis of the storage compartment and the longitudinal axis of the wrench.

One method of manipulating a rotary tool system includes inserting a first portion of a wrench within a storage compartment defined in the housing of a rotary tool, compressing a first spring extending into the storage compartment with the first portion of the wrench, contacting a lower portion of the storage compartment with the first portion of the wrench while the spring is compressed, contacting a protuberance located on the housing outside of the storage compartment with a second portion of the wrench, contacting a first upper portion of the storage compartment with a third portion of the wrench, deforming the opening of the compartment, moving the second portion of the wrench toward the opening of the compartment while the opening is deformed and biasing the first portion of the wrench against a second upper portion of the storage compartment with the first spring.

These and other advantages and features of the present invention may be discerned from reviewing the accompanying drawings and the detailed description of the preferred embodiment of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

DESCRIPTION

Figure 1:
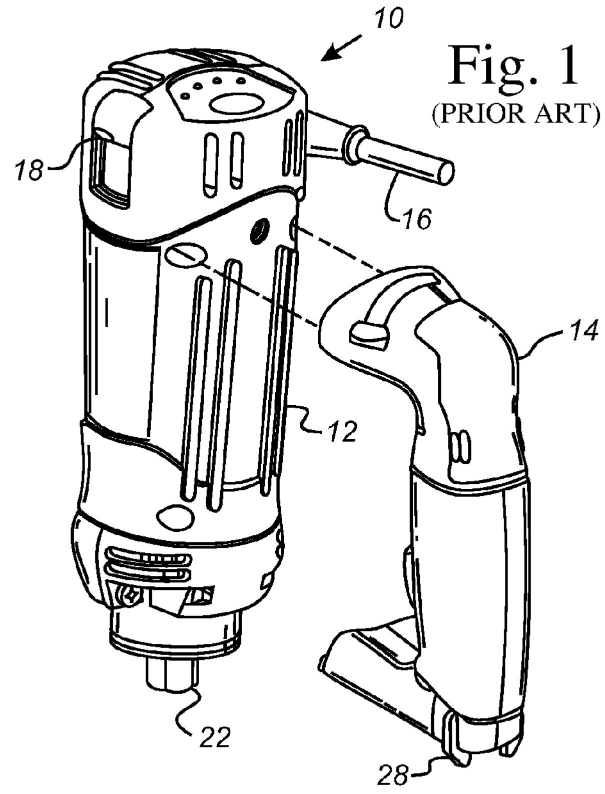
Fig. 1 (PRIOR ART)
FIG. 1 shows an exploded perspective view of a prior art rotary tool with a detached handle.
Figure 2:
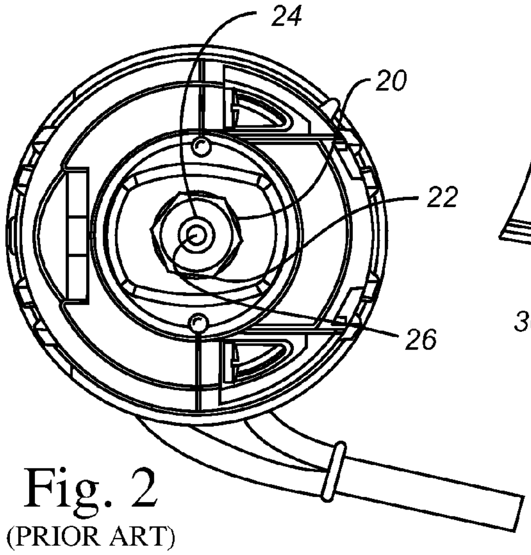
Fig. 2 (PRIOR ART)
FIG. 2 shows bottom plan view of the collet bit attachment structure of the rotary tool of FIG. 1.
Figure 3A:
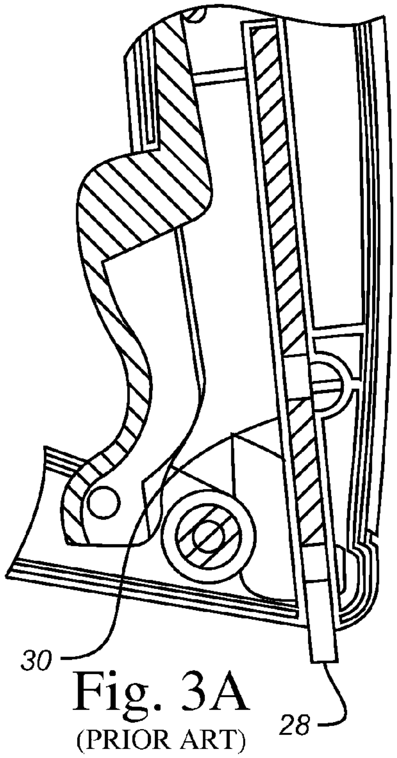
Fig. 3A (PRIOR ART)
FIG. 3A shows a partial cross sectional view of a wrench for use with the collet bit attachment structure of FIG. 2 stored within a compartment of the removable handle of the rotary tool of FIG. 1.
Figure 3B:
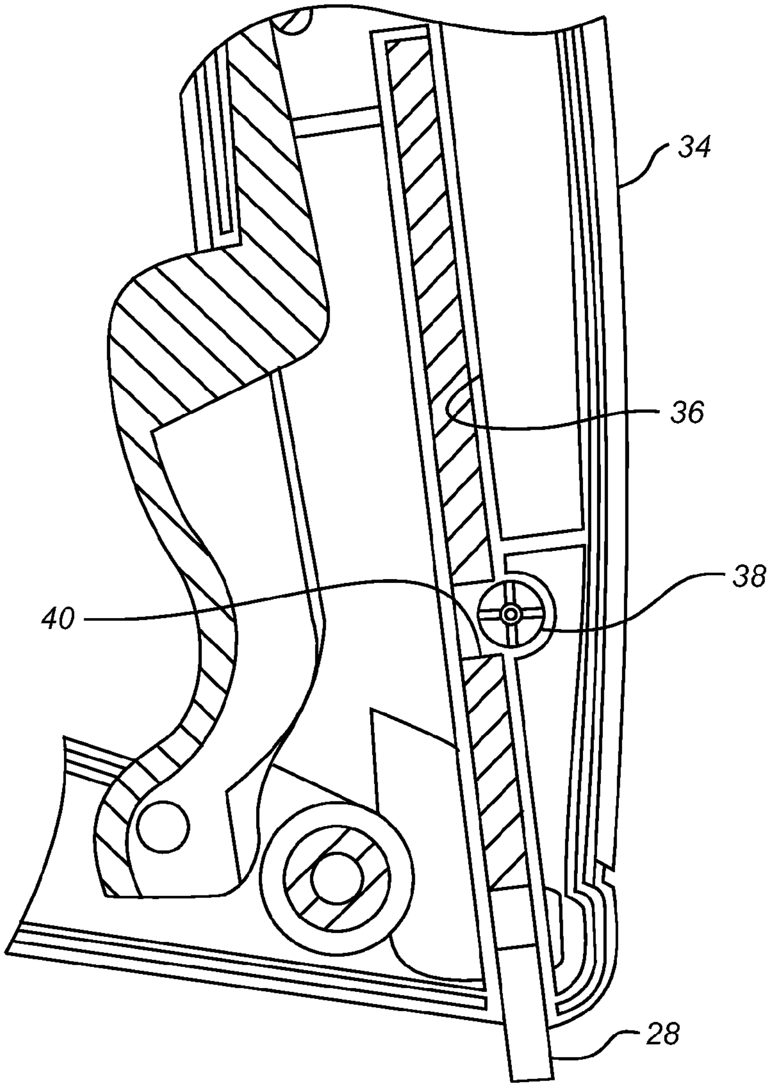
Fig. 3B (PRIOR ART)
FIG. 3B shows a partial cross sectional view of a wrench for use with the collet bit attachment structure of FIG. 2 stored within an alternative compartment wherein a coil spring is provided to securely hold the wrench within the compartment.
Figure 4:
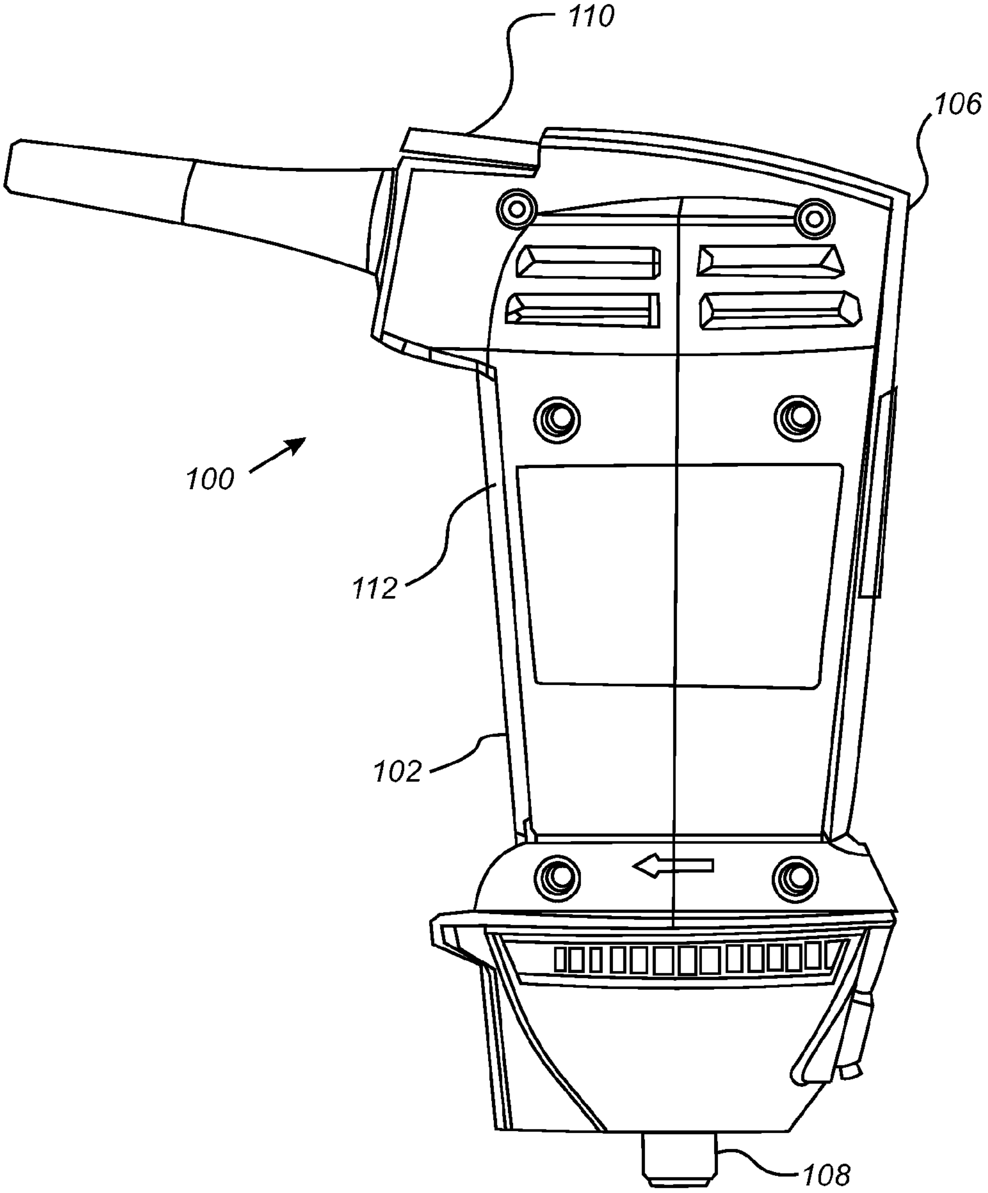
FIG. 4 shows a side perspective view of a hand rotary tool system including a wrench for use with the collet bit attachment structure of a rotary tool stored within a compartment of the rotary tool in accordance with principles of the invention.

Referring to FIG. 4, a rotary tool system 100 includes a housing 102 and a power supply cord 104. An electric motor (not shown) is located within the housing 102 and is turned on and off by a power on/off switch 106 mounted on the housing 102. A collet nut 108 is part of a collet bit attachment structure attached to a shaft (not shown) which extends from the motor out of the housing 102. The rotary tool system 100 further includes a wrench 110 which is sized to be used with the collet nut 108.

The housing 102 includes, in this embodiment, two clamshell portions 112 and 114. The clamshell portion 112 is, for the most part, a mirror image of the clamshell portion 114.

Figure 5:
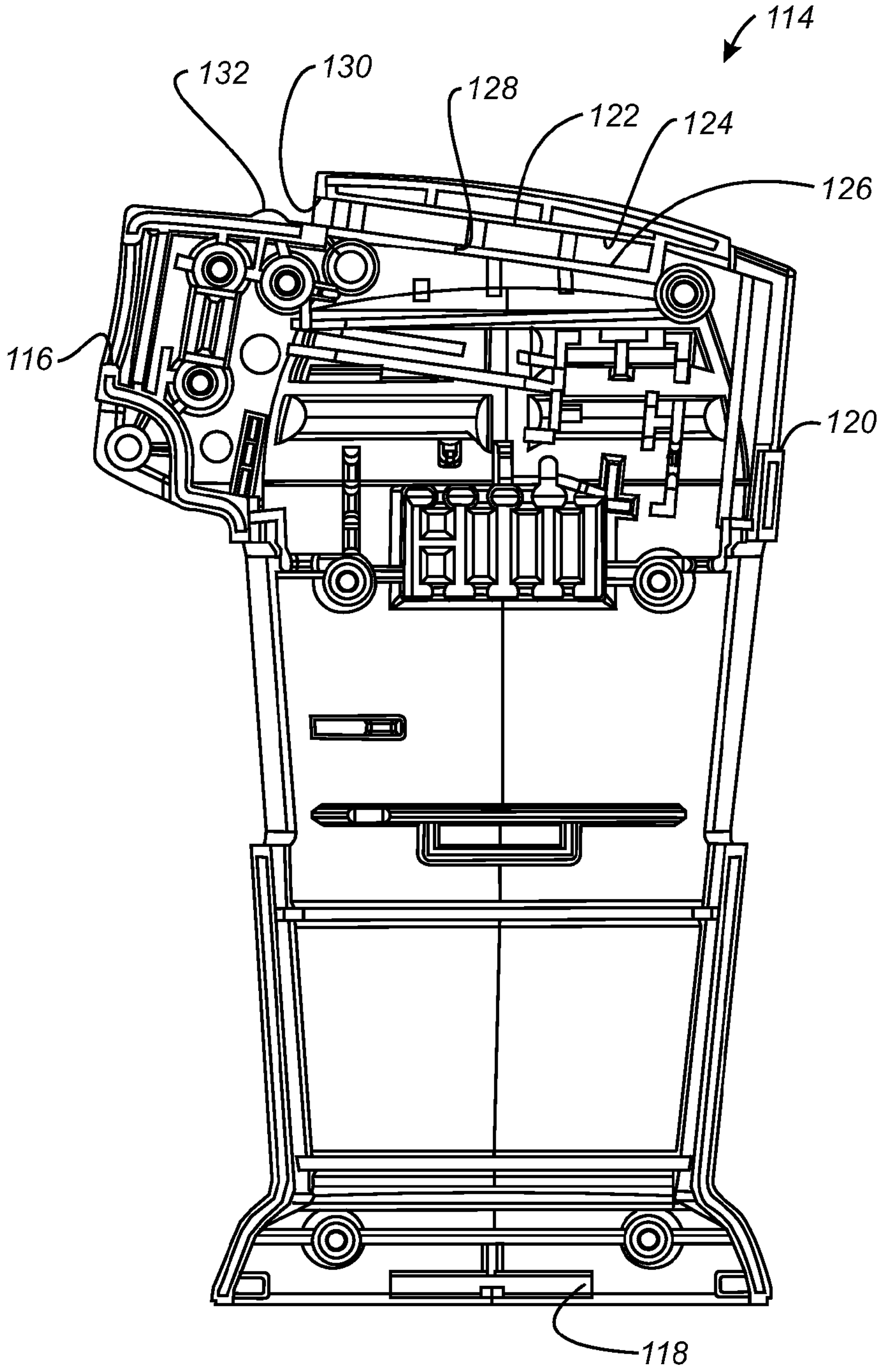
FIG. 5 shows a side plan view of the inside of a clam shell portion of the housing of the rotary tool of the hand rotary tool system of FIG. 4.

Accordingly, the internal aspects of the housing 102 are described herein with reference to clamshell 114. The clamshell portion 114 shown in FIG. 5 defines, along with the clamshell portion 112, a power port 116 through which the power supply cord 104 extends to provide power to the electric motor, a shaft port 118 through which the shaft (not shown) extends and a switch port 120 through which the power on/off switch 106 extends.

The housing 102 further includes a storage compartment 122. The storage compartment 122 includes an upper wall 124 and a lower wall 126. The lower wall 126 terminates at a spring port 128 located near to the opening 130 of the storage compartment 122. A protuberance 132 is located on the clamshell portion 114 near the opening 130 to the storage compartment 122. The housing 102, which may be molded from any acceptable material, is configured such that the shape of the opening 130 may be flexibly deformed while the protuberance 132 is relatively rigid.

Figure 6:
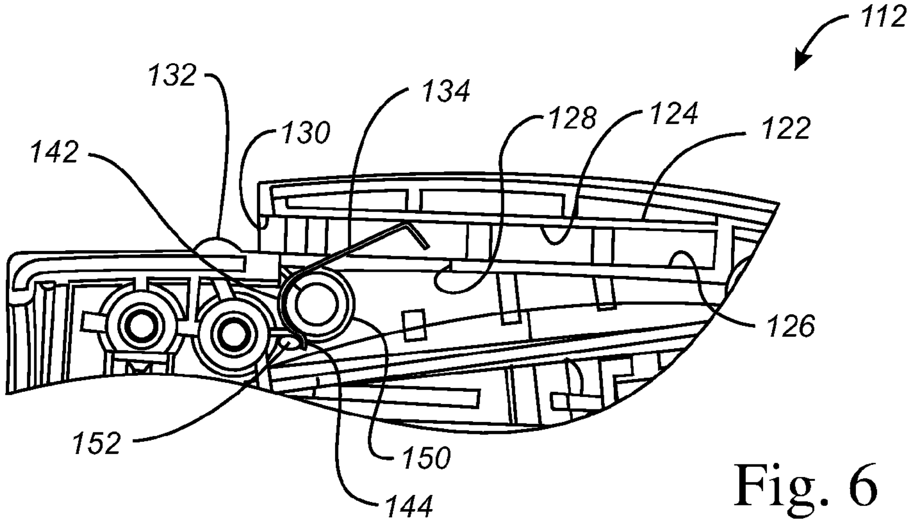
FIG. 6 shows a partial side plan view of the inside of the clam shell portion of FIG. 5 with a storage compartment spring installed in accordance with principles of the invention.
Figure 7:
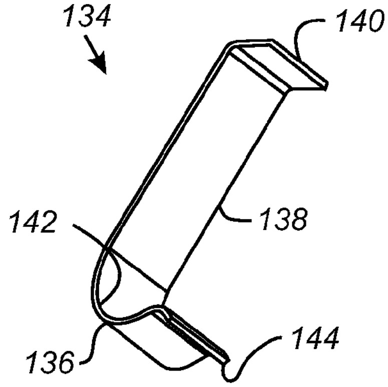
FIG. 7 shows a side perspective view of the storage compartment spring of FIG. 6.
Figure 8:
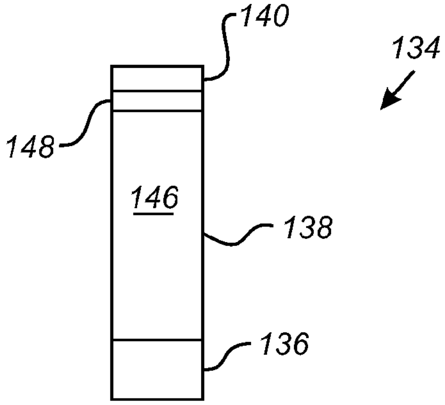
FIG. 8 shows a top plan view of the storage compartment spring of FIG. 6.

The spring port 128 is sized to allow a storage spring 134 to extend into the storage compartment 122 as shown in FIG. 6. The storage spring 134, which is more clearly shown in FIGS. 7 and 8, includes a base portion 136, an arm portion 138 and an end portion 140. The base portion 136 includes a pivot portion 142 and a stop portion 144. The arm portion 138 in this embodiment includes a flat and wide contact area 146 on the upper surface of the storage spring 134. The arm portion 138 is connected to the end portion 140 through a curved elbow 148. When the storage spring 134 is positioned within the housing 102, the lower surface of the pivot portion 142 abuts a pivot 150 while the upper surface of the stop portion 144 abuts a stop member 152 as shown in FIG. 6.

Figure 9:
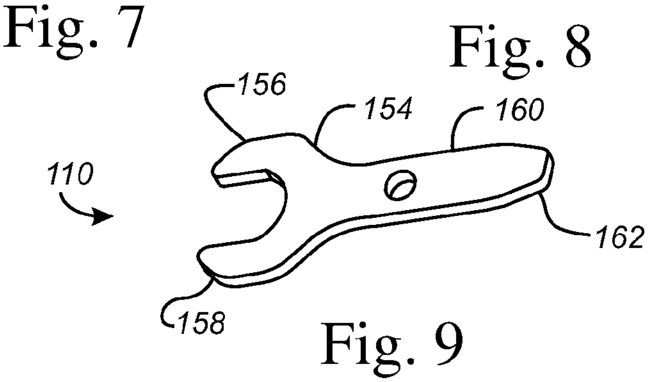
FIG. 9 shows a top perspective view of the wrench of FIG. 4.
Figures 10, 11:
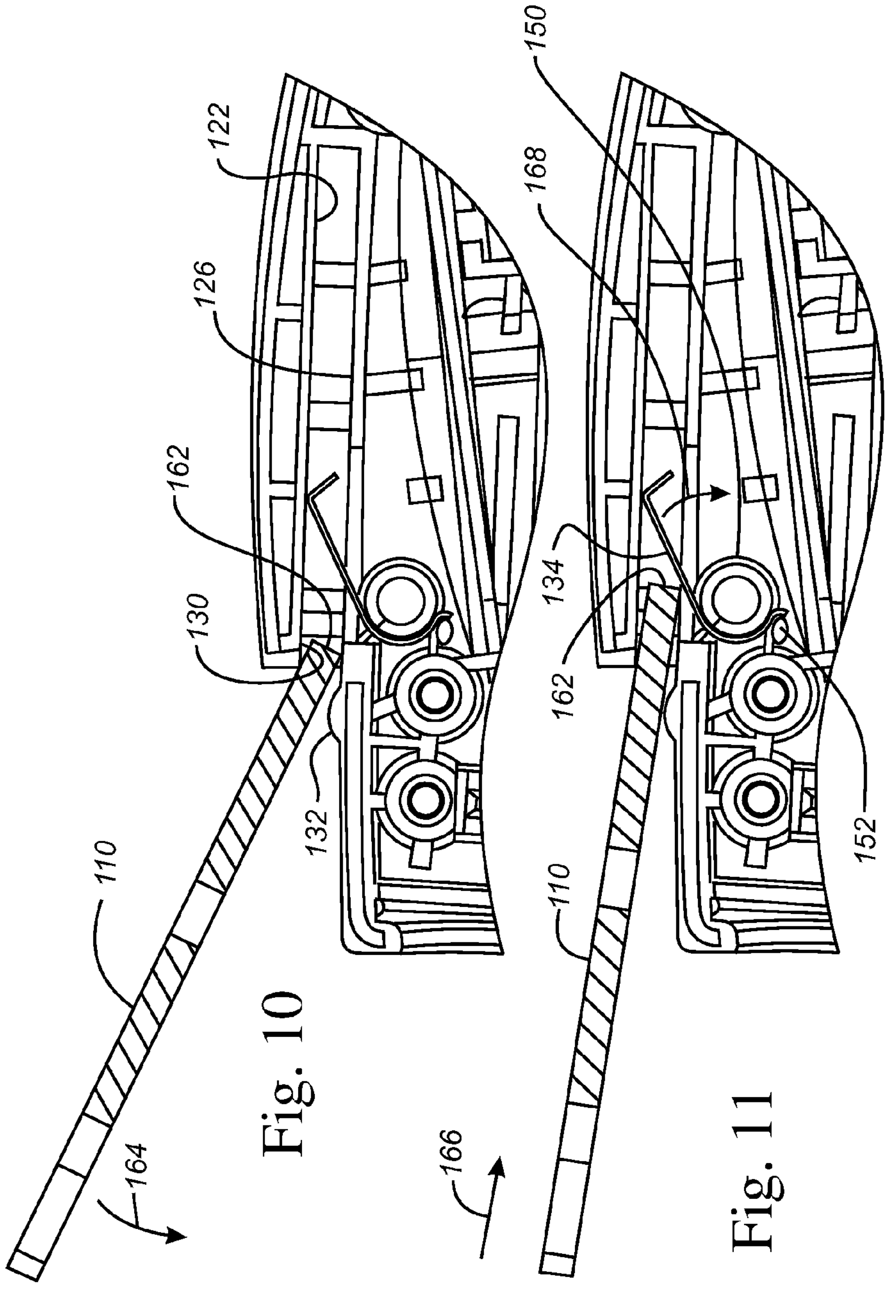
FIG. 10 shows a partial side plan view of the inside of the clam shell portion of FIG. 5 with a storage compartment spring installed with a side cross sectional view of the wrench of FIG. 1 being positioned within the opening of the storage compartment in accordance with principles of the invention.
FIG. 11 shows a partial side plan view of the inside of the clam shell portion of FIG. 5 with a side cross sectional view of the wrench of FIG. 1 being used to compress the storage compartment spring in accordance with principles of the invention.

The wrench 110, shown in FIG. 9, includes a head 154 with two tines 156 and 158 and a shaft 160 with a tapered end portion 162. The shaft 160 is configured to fit within the storage compartment 122. Insertion of the shaft 160 into the storage compartment 122 begins by maneuvering the tapered end portion 162 over the protuberance 132 and through the opening 130 of the storage compartment 122 as shown in FIG. 10.

As the wrench 110 is inserted further within the storage compartment 122, the position of the wrench 110 is constrained by the upper and lower surface of the opening 130. The size of the opening 130 thus forces the axis of the wrench 110 into closer alignment with the axis of the storage compartment 122 as the wrench 110 is further inserted into the storage compartment 122. Accordingly, the wrench 110 is rotated in the direction of the arrow 164 from the position shown in FIG. 10 to the position shown in FIG. 11.

The continued insertion of the wrench 10 into the storage compartment 122 in the direction of the arrow 166 brings the tapered end portion 162 of the shaft 160 into contact with the storage spring 134. As the tapered end portion 162 is forced against the contact area 146 of the storage spring 134, the storage spring 134 is rotated in the direction of the arrow 168. The base portion 136 of the storage spring 134, however, is trapped between the pivot 150 and the stop member 152. Accordingly, the storage spring 134 is compressed and more of the pivot portion 142 of the storage spring 134 is brought into contact with the pivot 150.

The storage spring 134 is configured such that the contact area 146 provides a wide surface for contact with the shaft 160. Thus, the potential for damage to the wrench 110 caused by the contact between the shaft 160 and the contact area 146 is reduced. Additionally, the storage spring 134 is smooth along the length of the arm portion 138, over the elbow 148 and along the length of the end portion 140. Accordingly, the potential that the storage spring 134 could scratch the lower surface of the wrench 110 is further reduced.

Compression of the storage spring 134 continues as the wrench 110 is further inserted into the storage compartment 122. Additionally, as more of the shaft 160 is inserted into the storage compartment 122, the axis of the wrench 110 continues to be driven toward alignment with the axis of the storage compartment 122. Specifically, the upper surface of the opening 130 contacts the upper surface of the shaft 160 and the storage spring 134 contacts the lower surface of the shaft 160, thereby causing rotation of the wrench 110 into alignment with the storage compartment 122.

Figure 12:
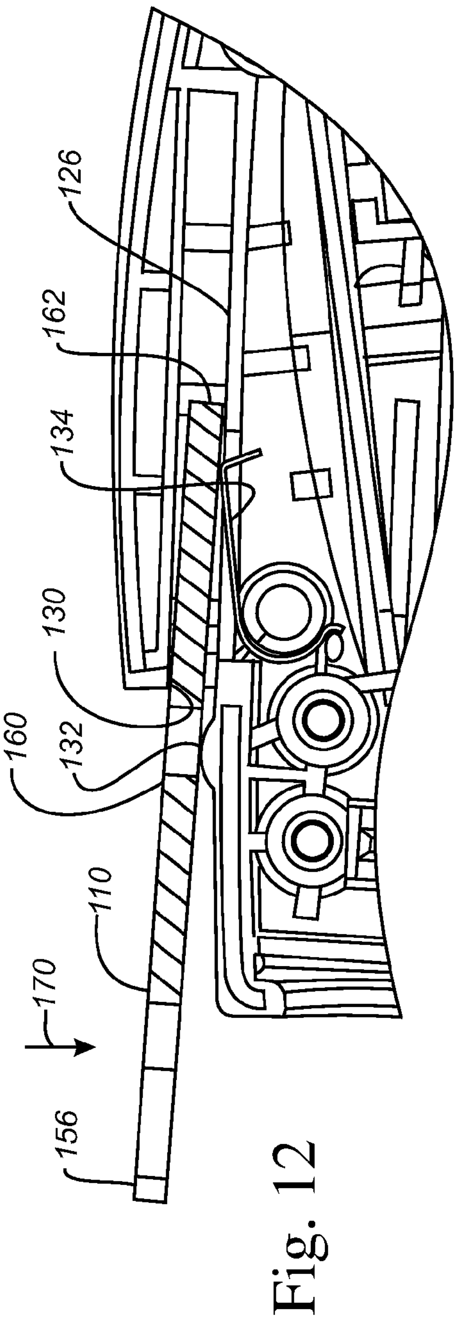
FIG. 12 shows a partial side plan view of the inside of the clam shell portion of FIG. 5 with a side cross sectional view of the wrench of FIG. 1 positioned such that the storage compartment spring is depressed and the wrench is wedged between a protuberance and a lower portion of the storage compartment on one side and an upper portion of the storage compartment on the other side.

As the tapered end portion 162 is inserted beyond the spring port 128, it comes into contact with the lower wall 126. Thus, the lower wall 126 contacts the lower surface of the shaft 160, thereby continuing rotation of the wrench 110 into alignment with the storage compartment 122 as the wrench 110 is further inserted within the storage compartment 122. The alignment of the wrench 110 with the storage compartment 122 continues until the wrench 110 is in the position shown in FIG. 12. In FIG. 12, the wrench 110 has been rotated such that the shaft 160 is firmly engaged with 1) the lower wall 126 at the tapered end portion 162, 2) the upper surface of the opening 130 at the upper surface of the shaft 160 and 3) the protuberance 132 at the lower surface of the shaft 160. Thus, further movement of the wrench 110 into the storage compartment 122 cannot occur without deformation at one of the contact points. Moreover, further rotation of the wrench toward the axis of the storage compartment 122 cannot occur.

As noted above, the opening 130 is configured to be flexibly deformable. Thus, pressure applied to the wrench 110 causes the wrench 110 to deform the opening 130 of the storage compartment 122, thereby allowing the wrench 110 to be further inserted into the storage compartment 122.

Figure 13:
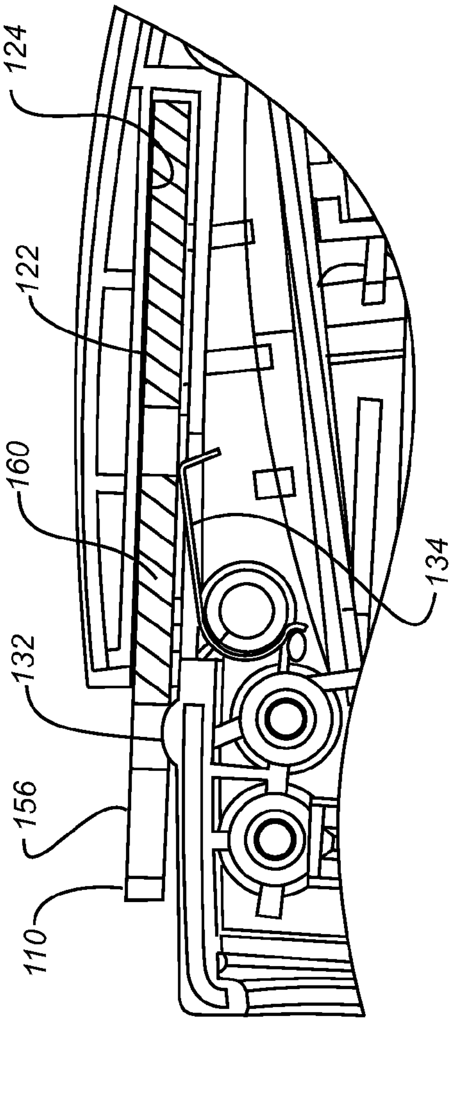
FIG. 13 shows a partial side plan view of the inside of the clam shell portion of FIG. 5 with a side cross sectional view of the wrench of FIG. 1 positioned within the storage compartment with the storage compartment spring biasing the wrench against an upper portion of the storage compartment.

As the insertion continues, the opening between the two tines 156 and 158 is positioned over the protuberance 132. Thus, the protuberance 132 no longer restrains the wrench 110 from moving into alignment with the storage compartment 122. Accordingly, the deformed opening 130 springs back to its original non-deformed condition forcing the wrench 110 in the direction of the arrow 170 to the position shown in FIG. 13. This provides positive feedback to a user that the wrench 110 is positioned within the storage compartment 122.

Additionally, the storage spring 134 continues to bias the shaft 160 of the wrench 110 in an upward direction. Since the head 154 of the wrench 110 is no longer supported by the protuberance 132, the continued bias from the storage spring 134 on the shaft 160 causes the wrench 110 to be firmly held between the storage spring 134 and the upper wall 124 of the storage compartment 122.

Figure 14:
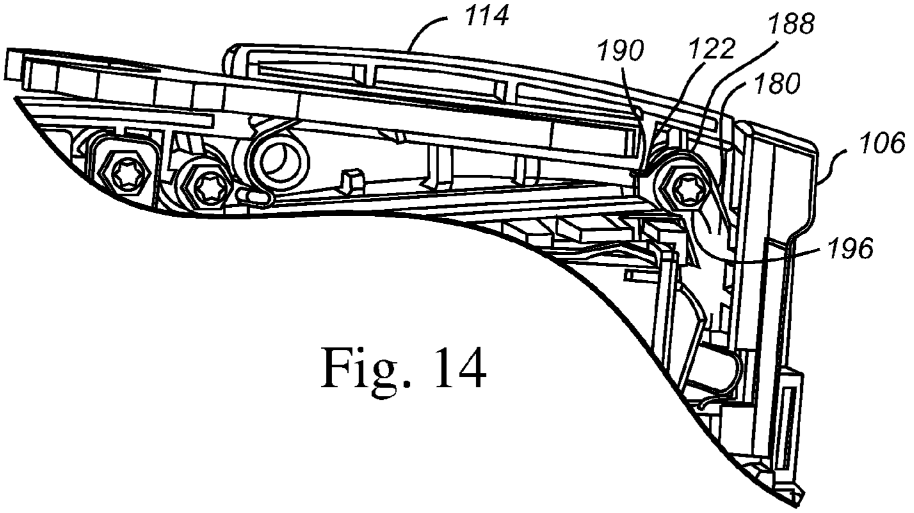
FIG. 14 shows a partial side plan view of the inside of the clam shell portion of FIG. 5 with a switch spring installed and biasing the power on/off switch of the rotary tool of FIG. 1 in a direction outwardly from the housing.
Figure 15:
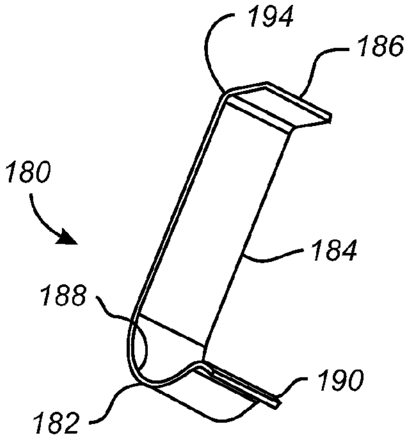
FIG. 15 shows a side perspective view of the switch spring of FIG. 14 which is structurally identical to the storage compartment spring of FIG. 6 in accordance with principles of the invention.
Figure 16:
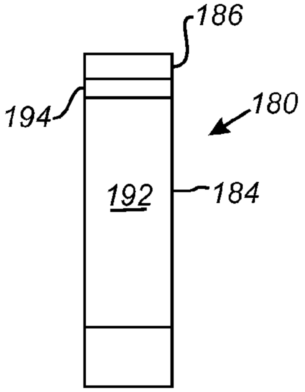
FIG. 16 shows a top plan view of the storage compartment spring of FIG. 15.

In this embodiment, the rotary tool system 100 is further configured to use a spring which is structurally identical to the storage spring 134 in other areas of the rotary tool system. Referring to FIG. 14, the switch spring 180 is identical to the storage spring 134. As shown in FIGS. 15 and 16, the switch spring 180 includes a base portion 182, an arm portion 184 and an end portion 186. The base portion 182 includes a pivot portion 188 and a stop portion 190. The arm portion 184 in this embodiment includes a flat and wide contact area 192 on the upper surface of the switch spring 180. The arm portion 184 is connected to the end portion 186 through a curved elbow 194. When the storage spring 134 is positioned within the housing 102, the lower surface of the pivot portion 182 abuts a pivot 196 while the upper surface of the stop portion 190 abuts a corner of the wall defining the storage compartment 122 which functions as a stop member as shown in FIG. 14.

Figure 17:
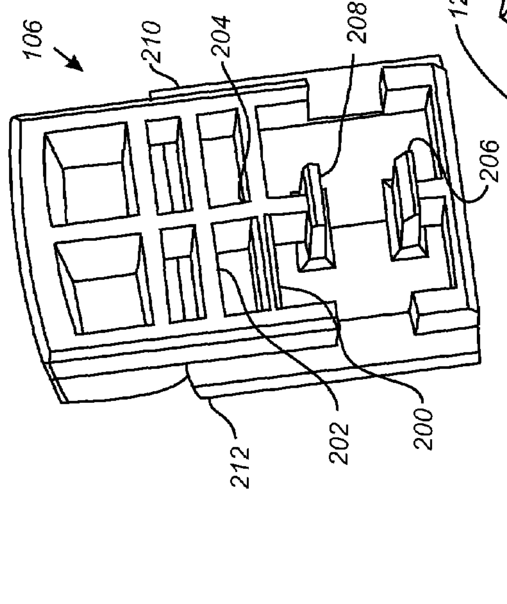
FIG. 17 shows a bottom perspective view of the power on/off switch of the rotary tool of FIG. 1.
Figure 18:
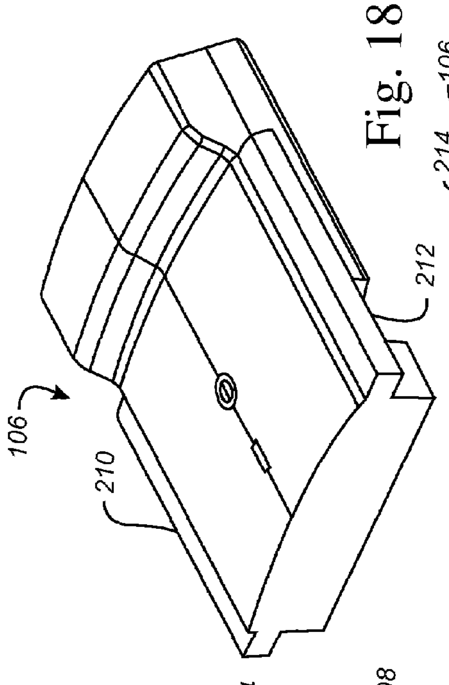
FIG. 18 shows a top perspective view of the power on/off switch of the rotary tool of FIG. 1.

The switch spring 180 is positioned to bias the on/off switch 106 which is shown in more detail in FIGS. 17 and 18. The power on/off switch 106 in this embodiment includes a number of ribs such as ribs 200, 202 and 204 along with two actuators 206 and 208. Two flanges 210 and 212 extend outwardly from the on/off switch 106.

When assembled, the actuators 206 and 208 extend through the switch port 120 to control the position of a mechanical switch to alternately provide power to and remove power from the motor (not shown) as the on/off switch 106 is moved along guides (not shown) in the housing 102 which are sized slightly larger than the flanges 210 and 212.

The ribs 200, 202 and 204 are provided to increase the strength of the on/off switch 106 while reducing the amount of materials used in the production of the on/off switch 106. In this embodiment, the tip portion 214 of the rib 200, which is beveled as shown most clearly in FIG. 19, is biased by the switch spring 180.

Figure 19:
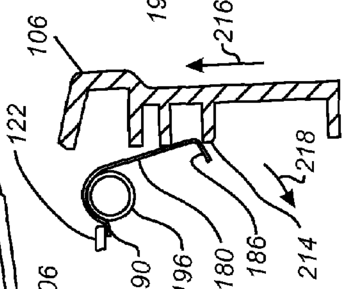
FIG. 19 shows a schematic view of the end portion of the switch spring of FIG. 14 biasing the power on/off switch of the rotary tool of FIG. 1 in a direction outwardly from the housing.

In operation, the on/off switch 106 is in the "off" position shown in FIG. 19 which places the rotary tool system 100 in a de-energized state. To energize the rotary tool system 100, an operator pushes the on/off switch 106 upwardly in the direction of the arrow 216. This forces the tip portion 214 more firmly against the end portion 186 of the switch spring 180. Because the stop portion 190 abuts the wall of the storage compartment 122 on the upper surface of the switch spring 180 while the pivot portion 188 contacts the pivot 196 on the lower surface of the switch spring 180, the base portion 182 of the switch spring 180 is anchored. Accordingly, the force of the tip portion 214 against the end portion 186 causes the switch spring 180 to compress and the arm portion 184 and the end portion 186 rotate about the pivot 196 in the direction of the arrow 218. The rib 202 is positioned within the switch 106 to limit movement of the arm portion 184 toward the switch 106 as pressure is applied to the end portion 186 thereby ensuring that the switch spring 180 rotates in the direction of the arrow 218.

Figure 20:
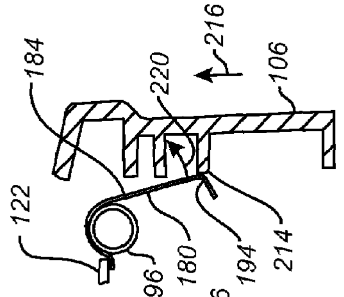
FIG. 20 shows a schematic view of the elbow portion of the switch spring of FIG. 14 biasing the power on/off switch of the rotary tool of FIG. 1 in a direction outwardly from the housing when the power on/off switch has been moved upwardly from the position shown in FIG. 19.
Figure 21:
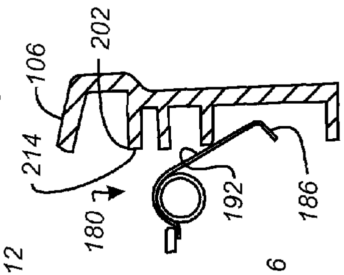
FIG. 21 shows a schematic view of the arm portion of the switch spring of FIG. 14 biasing the power on/off switch of the rotary tool of FIG. 1 in a direction outwardly from the housing when the power on/off switch has been moved upwardly from the position shown in FIG. 20.

The rotation of the arm portion 184 and the end portion 186 about the pivot 196 in the direction of the arrow 218 continues until the on/off switch 106 is in the position shown in FIG. 20. In FIG. 20, the tip portion 214 has moved along the switch spring 180 to a position over the elbow 194. Accordingly, continued movement of the on/off switch in the direction of the arrow 216 moves the tip portion 214 of the on/off switch 106 away from the contact point between the tip portion 214 and the switch spring 180. Thus, as the on/off switch 106 continues to move upwardly over the arm portion 184, the arm portion 184 and the end portion 186 reverse the direction of rotation and begin to rotate in the direction of the arrow 220 to the "on" position shown in FIG. 21.

Thus, the switch spring 180 maintains contact with the on/off switch 106 throughout the travel path of the on/off switch 106. Moreover, the switch spring 180 maintains a continuous bias against the on/off switch 106 in the direction of the arrow 220 over the entire travel path of the on/off switch 106. Thus, once the tip portion 214 passes the elbow 194 when moving in the direction of the arrow 216, the switch spring 180 provides assistance to the operator in moving the on/off switch 106 completely into the "on" position. Conversely, when the tip portion 214 passes the elbow 194 when moving in the direction opposite of the arrow 216, the switch spring 180 provides assistance to the operator in moving the on/off switch 106 completely into the "off" position.

The structure of the switch spring 180 thus allows for the end portion 186 to be used as a contact area in addition to the contact area 192 so as to vary the effect on the on/off switch 106. If desired, a more consistent biasing may be provided by configuring the switch spring 180 to contact the on/off switch 106 along just the arm portion 184 and the elbow 194, in a manner similar to the configuration of the storage spring 134, or just along the end portion 186 and the elbow 194.

Moreover, the angle between the end portion 184 and the arm portion 184 may be varied to provide different effects. In one embodiment, the end portion and the arm portion are formed on with the same radius of curvature and the same origin to provide a more gradual change. Such a configuration, for example, may be used with a structure such as the rib 202 to provide for smooth operation over the travel path of a component. If desired, the spring can be configured with a curve that does not significantly assist in moving the switch to a different position while applying a biasing force against the switch.

Additionally, the spring may be used to provide increased resistance to movement and/or additional indication of proper seating of a wrench. For example, the hole in the wrench 110 shown in FIG. 9 may be configured such that the hole is positioned over the elbow 148 of the storage spring 134 when the wrench 110 is inserted into the storage compartment 122, and sized such that at least a portion of the elbow 148 is allowed to extend upwardly into the hole. Accordingly, when the hole is positioned over the elbow 148, the storage spring 122 partially decompresses as the elbow moves into the hole. This provides an additional indication that the wrench 110 is properly positioned within the storage compartment 122. Additionally, removal of the wrench 110 requires the storage spring 134 to be compressed prior to removal of the wrench 110, providing additional resistance to the removal of the wrench 110. Alternatively, a spring could be configured to move into another surface feature of the wrench such as a recess to provide a similar result.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

The invention claimed is:

1. A hand power tool system comprising:

a housing;

a storage compartment within the housing;

a wrench for manipulating a collet bit attachment structure, a portion of the wrench sized to fit within the storage compartment;

a first spring extending into the storage cavity and positioned to bias the portion of the wrench against an inner wall of the storage compartment; and a protuberance positioned on the housing, such that when the portion of the wrench is partially within the cavity, the protuberance causes a first misalignment between the longitudinal axis of the storage compartment and the longitudinal axis of the wrench and when the portion of the wrench is fully within the cavity, the protuberance does not cause a misalignment between the longitudinal axis of the storage compartment and the longitudinal axis of the wrench as large as the first misalignment.

2. The hand power tool system of claim 1, wherein:

the storage compartment includes an opening resiliently deformable from a first diameter to a second diameter;

the second diameter is larger than the first diameter; and the protuberance is positioned such that movement of the portion of the wrench into the storage compartment causes the opening to be deformed from the first diameter to the second diameter.

3. The hand tool system of claim 2, wherein;

the protuberance is configured such that when the portion of the wrench is located within the storage compartment, the opening is not deformed.

4. The system of claim 1, further comprising:

a switch movable between a first position wherein a motor is not energized and a second position wherein the motor is energized; and a second spring structurally identical to the first spring and positioned to bias the switch.

5. The system of claim 4, wherein the second spring comprises:

a base portion configured to be engaged with the housing;

an arm portion extending from the base portion; and an end portion extending angularly from the arm portion.

6. The system of claim 5, wherein the end portion of the second spring contacts the switch when the switch is in the first position and the arm portion of the second spring contacts the switch when the switch is in the second position.

7. The system of claim 1, wherein the first spring comprises:

a base portion configured to be engaged with the housing; and an arm portion extending from the base portion for a length, the arm portion including a contact area for contacting the portion of the wrench and configured such that when the contact area contacts the portion of the wrench, the portion of the contact area that is in contact with the wrench is wider than the length of the contact area that is in contact with the wrench along the length of the arm portion.

8. A hand power tool system comprising:

a housing;

a storage compartment within the housing;

a wrench for manipulating a collet bit attachment structure, a portion of the wrench sized to fit within the storage compartment;

a first spring extending into the storage cavity and positioned to bias the portion of the wrench against an inner wall of the storage compartment;

a switch movably attached to the housing;

a second spring structurally identical to the first spring and positioned within the housing to bias the switch away from the housing; and a protuberance positioned on the housing such that when the portion of the wrench is partially within the cavity, the protuberance causes a first misalignment between the longitudinal axis of the storage compartment and the longitudinal axis of the wrench.

9. The hand power tool system of claim 8, wherein:

the storage compartment includes an opening resiliently deformable from a first diameter to a second diameter;

the second diameter is larger than the first diameter; and the protuberance is positioned such that movement of the portion of the wrench into the storage compartment causes the opening to be deformed from the first diameter to the second diameter.

10. The hand tool system of claim 9, wherein;

the protuberance is configured such that when the portion of the wrench is located within the storage compartment, the opening is not deformed.

11. The system of claim 8, wherein the second spring comprises:

a base portion configured to be engaged with the housing;

an arm portion extending from the base portion; and an end portion extending angularly from the arm portion.

12. The system of claim 11, wherein the end portion of the second spring contacts the switch when the switch is in the first position and the arm portion of the second spring contacts the switch when the switch is in the second position.

13. The system of claim 8, wherein the first spring comprises:

a base portion configured to be engaged with the housing; and an arm portion extending from the base portion for a length, the arm portion including a contact area for contacting the portion of the wrench and configured such that when the contact area contacts the portion of the wrench, the portion of the contact area that is in contact with the wrench is wider than the length of the contact area that is in contact with the wrench along the length of the arm portion.

* * * * *